US007163761B2

(12) United States Patent  
Debe et al.

(10) Patent No.: US 7,163,761 B2
(45) Date of Patent: Jan. 16, 2007

(54) FUEL CELL STACK

(75) Inventors: Mark Kevitt Debe, Stillwater, MN (US); Larry Allan Schleif, Monticello, MN (US); Thomas Herdtle, Inver Grove Heights, MN (US); Andrew James Steinbach, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 532 days.

(21) Appl. No.: 10/294,224

(22) Filed: Nov. 14, 2002

(65) Prior Publication Data

US 2004/0096724 A1  May 20, 2004

(51) Int. Cl.
*H01M 8/02* (2006.01)
*H01M 8/24* (2006.01)

(52) U.S. Cl. ............................. 429/37; 429/32
(58) Field of Classification Search ................ None
See application file for complete search history.

(56) References Cited

U.S. PATENT DOCUMENTS

| | | | |
|---|---|---|---|
| 4,430,390 A | 2/1984 | Fekete | |
| 4,692,391 A | 9/1987 | Hirota | |
| 4,997,728 A | 3/1991 | Onoda et al. | |
| 5,543,240 A | 8/1996 | Lee et al. | |
| 5,607,786 A | 3/1997 | Guthrie et al. | |
| 5,686,200 A | 11/1997 | Barton et al. | |
| 5,750,280 A | 5/1998 | Akagi | |
| 5,789,091 A | 8/1998 | Wozniczka et al. | |
| 5,998,054 A | 12/1999 | Jones et al. | |
| 6,030,718 A | 2/2000 | Fuglevand et al. | |
| 6,057,053 A | 5/2000 | Gibb | |
| 6,218,035 B1 | 4/2001 | Fuglevand et al. | |
| 6,218,039 B1 | 4/2001 | Mease et al. | |
| 6,258,475 B1 | 7/2001 | Sugita et al. | |
| 6,322,914 B1 | 11/2001 | Chow et al. | |
| 6,322,919 B1 | 11/2001 | Yang et al. | |
| 6,329,093 B1 | 12/2001 | Ohara et al. | |
| 6,361,895 B1 | 3/2002 | Itou et al. | |
| 2004/0048138 A1* | 3/2004 | King ........................... 429/38 |

FOREIGN PATENT DOCUMENTS

| | | |
|---|---|---|
| DE | 19852363 C1 | 5/2000 |
| JP | 58-164168 | 9/1983 |
| JP | 61-148770 | 7/1986 |
| JP | 05-182684 | 7/1993 |
| JP | 07-029592 | 1/1995 |
| JP | 09-092324 | 4/1997 |
| JP | 09-139223 | 5/1997 |
| JP | 2000-208163 | 7/2000 |

(Continued)

*Primary Examiner*—Jonathan Crepeau
(74) *Attorney, Agent, or Firm*—Philip Y. Dahl

(57) ABSTRACT

A fuel cell stack is provided comprising fuel cell modules least compression plates; and at least one plurality of mechanical linkages connecting a pair of compression plates located on either side of at least one fuel cell module, which may be engaged to maintain a predetermined gap distance between the pair of compression plates. The present invention additionally provides a fuel cell stack comprising: fuel cell modules stacked alternately with compression plates; mechanical linkages connecting a first pair of compression plates directly adjacent to a first fuel cell module; mechanical linkages connecting a second pair of compression plates directly adjacent to a second fuel cell module; where a) the first and second fuel cell modules may be maintained under compression, and b) the compression on each fuel cell module may be adjusted essentially independently of the compression on the other.

6 Claims, 5 Drawing Sheets

FOREIGN PATENT DOCUMENTS

| | | |
|---|---|---|
| JP | 2001-143741 | 5/2001 |
| JP | 2001-167745 | 6/2001 |
| JP | 2001319673 | 11/2001 |
| WO | WO 95/28010 | 10/1995 |
| WO | WO 98/57384 | 12/1998 |
| WO | WO 2001/56104 A2 | 8/2001 |

* cited by examiner

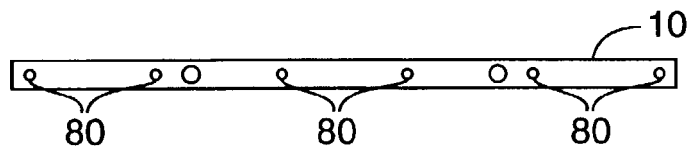
FIG. 4a
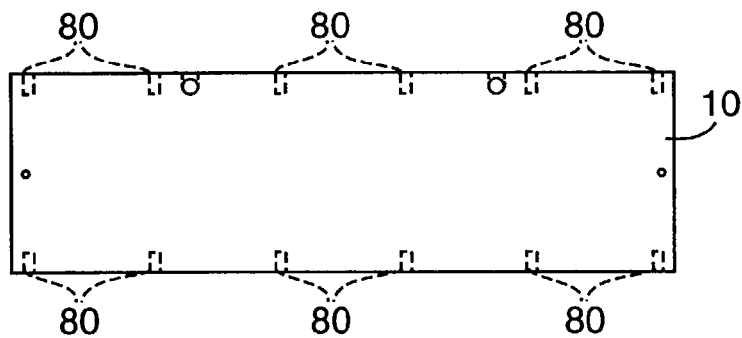
FIG. 4b
| L= | 3.858cm<br>1.519" | 3.856cm<br>1.518" | 3.858cm<br>1.519" | 3.861cm<br>1.520" | 3.866cm<br>1.522" | 3.866cm<br>1.522" |
|---|---|---|---|---|---|---|
| | 1 | 2 | 3 | 4 | 5 | 6 |
| | 12 | 11 | 10 | 9 | 8 | 7 |
| | 1.518"<br>3.856cm | 1.517"<br>3.853cm | 1.516"<br>3.851cm | 1.513"<br>3.843cm | 1.515"<br>3.848cm | 1.516"<br>3.851cm |
FIG. 6a
| | 3.825cm<br>1.506" | 3.825cm<br>1.506" | 3.828cm<br>1.507" | 3.830cm<br>1.508" | 3.833cm<br>1.509" | 3.828cm<br>1.507" |
|---|---|---|---|---|---|---|
| | 1 | 2 | 3 | 4 | 5 | 6 |
| | 12 | 11 | 10 | 9 | 8 | 7 |
| | 1.5065"<br>3.827cm | 1.509"<br>3.833cm | 1.510"<br>3.835cm | 1.5075"<br>3.829cm | 1.506"<br>3.825cm | 1.503"<br>3.818cm |
FIG. 6b

FUEL CELL STACK

This invention was made with Government support under Cooperative Agreement DE-FC02-99EE50582 awarded by DOE. The Government has certain rights in this invention.

FIELD OF THE INVENTION

This invention relates to a fuel cell stack comprising fuel cell modules, which comprise membrane electrode assemblies, stacked alternately with compression plates connected by mechanical linkages by which the fuel cell modules may be maintained under compression at a fixed strain. Typically the compression on a fuel cell module may be adjusted independently of the compression on any other fuel cell module.

BACKGROUND OF THE INVENTION

A typical fuel cell stack is constructed by methods and mechanisms that collectively compress all of the MEA's in the stack to a common pressure. This may be accomplished by use of tie-rods, long bolts, or clamping devices located on the perimeter of the stack or running through the middle of the stack. In such stacks, the compressive force is nominally the same at all points within the stack but the compressive strain of any individual MEA is not individually controlled nor predictable. In order to limit the compressive strain experienced by an individual MEA in such a stack, the MEA may include a "hard stop" feature, such as a shim of essentially incompressible material underlying or enclosed in the seals or gaskets of the MEA. This solution adds complexity to the design and manufacture of the MEA. Alternately, the gaskets or seals may be specified for a precise modulus in order to obtain a precise strain at the applied force that will be applied to the entire stack, which also must be specified precisely. In addition to requiring tight specifications, this approach requires that the gaskets or seals have a high modulus, which is generally incompatible with the primary purpose of the seals and gaskets to seal against gas leaks. Furthermore, in a stack where all of the MEA's are compressed collectively, the stack has to be disassembled in order to remove or replace a failed MEA. This necessarily relieves the compressive forces on all MEA's, which may adversely affect the ability of an MEA to reseal and perform to its prior ability.

SUMMARY OF THE INVENTION

Briefly, the present invention provides a fuel cell stack comprising one or more fuel cell modules, each fuel cell module comprising at least one membrane electrode assembly having no hard stop layer; two or more compression plates; and at least one plurality of mechanical linkages connecting at least one pair of compression plates located on either side of at least one fuel cell module, which may be engaged to maintain a predetermined gap distance between the pair of compression plates.

In another aspect, the present invention provides a fuel cell stack comprising: two or more fuel cell modules stacked alternately with three or more compression plates; a first plurality of mechanical linkages connecting a first pair of compression plates directly adjacent to, and on either side of, a first fuel cell module; a second plurality of mechanical linkages connecting a second pair of compression plates which are directly adjacent to, and on either side of, a second fuel cell module; wherein one compression plate is common to the first and second pairs of compression plates; where a) the first and second fuel cell modules may be maintained under compression, and b) the compression on each of said first and second fuel cell modules may be adjusted essentially independently of the compression on the other.

In another aspect, the present invention provides a method of removing a fuel cell module from a fuel cell stack comprising the steps of: a) selecting a fuel cell module to be removed; b) releasing the compression on said fuel cell module essentially without altering the compression on any other fuel cell module in the stack; and c) removing the selected fuel cell module from the stack.

What has not been described in the art, and is provided by the present invention, is a fuel cell stack wherein a controlled amount of compressive strain is applied to a fuel cell module or independently to each of multiple fuel cell modules by mechanical linkages having an adjustable effective length.

In this application: "hard stop" or "hard stop layer" means a layer in an membrane electrode assembly (MEA) which halts compression of the MEA at a fixed thickness or strain, other than: an ion conducting membrane layer, a catalyst layer, a gas diffusion layer, a seal or gasket layer or an adhesive layer.

It is an advantage of the present invention to provide a fuel cell stack wherein a controlled amount of compressive strain is applied to a fuel cell module or independently to each of multiple fuel cell modules. It is a further advantage of the present invention to provide a fuel cell stack wherein compression on any one fuel cell module may be released to allow removal of that module without releasing compression on any other fuel cell module. It is a further advantage of the present invention to provide a fuel cell stack comprising dual function plates which provide compression and cooling.

BRIEF DESCRIPTION OF THE DRAWING

FIGS. 4(*a*) and (*b*) are a diagrams representing a compression plate according to the present invention, described in Example 1 below.

FIGS. 6(*a*) and (*b*) are diagrams illustrating compression of actual or simulated fuel cell modules according to the present invention, described in Examples 1 and 2 below.

DETAILED DESCRIPTION OF PREFERRED EMBODIMENTS

Figure 1:
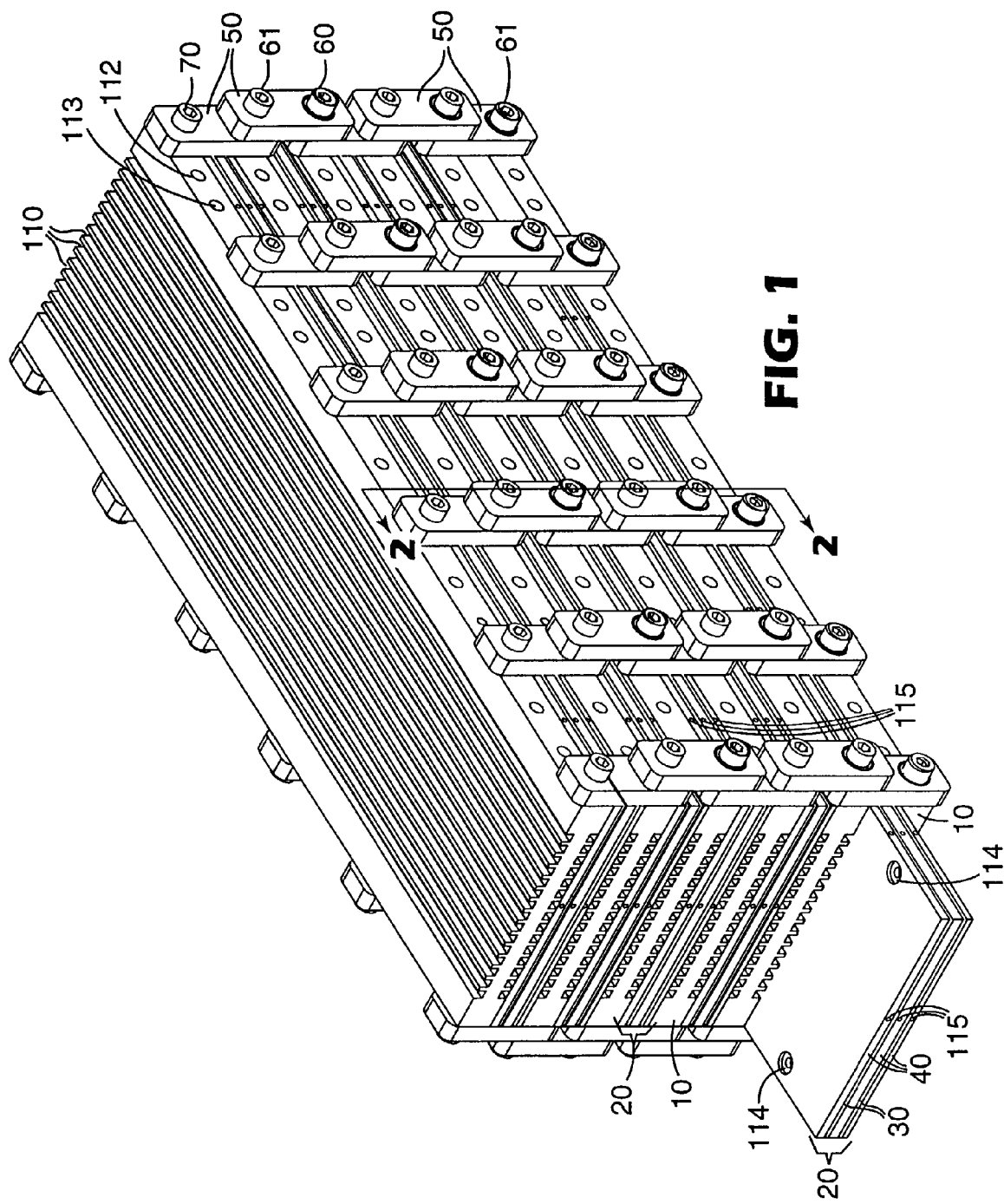
FIG. 1 is an isometric drawing representing an orthogonal projection of a fuel cell stack according to the present invention.

Fuel cells utilize a fuel such as hydrogen and an oxidizing agent such as oxygen to produce an electrical current. The two chemical reactants, i.e., the fuel and the oxidizing agent, separately react at two isolated electrodes containing catalyst. An ion exchange element is located between the electrodes to prevent direct chemical reaction of the two reactants and to conduct ions. In the case of a typical hydrogen fuel cell, the ion exchange element is an ion conducting membrane (ICM). The ICM conducts protons (H⁺) from the hydrogen electrode to the oxygen electrode. Electrons follow a separate external electrical path, thereby generating an electric current. The combination of an ICM and electrodes is commonly referred to as a "membrane electrode assembly," or MEA. The catalyst electrode material may be coated directly on the ICM to form a catalyst-coated membrane (CCM). Typically a fluid transport layer is applied to each side of the ICM, which may be called a gas diffusion layer (GDL), a diffuser/current collector (DCC) or a fluid transport layer (FTL). The GDL is a layer of porous material which is electrically conductive yet which allows the passage of reactant and product fluids. Typical gas diffusion layers comprise carbon fibers, often in the form of a paper or a cloth. The term MEA describes a CCM with or without GDL's attached. The term 5-layer MEA specifically describes a CCM with GDL's attached. The catalyst electrode layers may be applied to the ICM or to the GDL during manufacture, so long as they are disposed between ICM and GDL in the completed MEA so that the resulting 5-layer MEA comprises, in order: GDL, catalyst, ICM, catalyst, GDL. In the practice of the present invention, any suitable MEA's may be used.

Any suitable ICM may be used in the practice of the present invention. The ICM typically has a thickness of less than 50 μm, more typically less than 40 μm, more typically less than 30 μm, and most typically about 25 μm. The ICM is typically comprised of a polymer electrolyte that is an acid-functional fluoropolymer, such as Nafion® (DuPont Chemicals, Wilmington Del.) and Flemion™ (Asahi Glass Co. Ltd., Tokyo, Japan). The polymer electrolytes useful in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an acid equivalent weight of 1200 or less, more typically 1100 or less, more typically 1050 or less, and most typically about 1000.

Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, Spectra-Carb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50–90% carbon and 10–50% catalyst metal by weight, the catalyst metal typically comprising Pt for the cathode and Pt and Ru in a weight ratio of 2:1 for the anode. Typically, the catalyst is applied to the ICM or to the GDL in the form of a catalyst ink. The catalyst ink typically comprises polymer electrolyte material, which may or may not be the same polymer electrolyte material which comprises the ICM. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an equivalent weight of 1200 or less, more typically 1100 or less, more typically 1050 or less, and most typically about 1000. The catalyst ink typically comprises a dispersion of catalyst particles in a dispersion of the polymer electrolyte. The ink typically contains 5–30% solids (i.e. polymer and catalyst) and more typically 10–20% solids. The electrolyte dispersion is typically an aqueous dispersion, which may additionally contain alcohols and polyalcohols such a glycerin and ethylene glycol. The water, alcohol, and polyalcohol content may be adjusted to alter Theological properties of the ink. The ink typically contains 0–50% alcohol and 0–20% polyalcohol. In addition, the ink may contain 0–2% of a suitable dispersant. The ink is typically made by stirring with heat followed by dilution to a coatable consistency.

The catalyst may be applied to the ICM or the GDL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Alternately, a CCM may be made using a nanostructured catalyst, as disclosed in U.S. Pat. No. 5,338,430 (nanostructured electrodes embedded in solid polymer electrolyte) or U.S. Pat. No. 5,879,828 (MEA's having electrode layers comprising nanostructured elements).

The MEA is typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

The outer periphery of the contact area between the MBA and the distribution plate is typically sealed or gasketed so as to prevent unwanted escape or cross-over of reactant or product gasses. In the practice of the present invention, any suitable gasket design or material may be used, including a closed cell foam gasket. In the practice of the present invention, the gasket does not require a high or well-controlled modulus. A low modulus material is typically used. Where an MBA is designed with an added hard stop layer, that layer typically underlies the gasket or seals, and may be interposed between the 1CM and the gasket. In the practice of the present invention, the MBA does not require a hard stop layer.

The MEA is maintained under compression during use. The degree of compression is selected with reference to a given MEA so as to avoid over-compression or under-compression. Under-compression may result in poor electrical contact between the various layers and poor sealing at the gaskets. Over-compression may result in damage to the MEA and occlusion of gas pathways, by closing pores in the GDL or by "tenting" of the GDL into the flow field channels of the distribution plates.

Figure 2:
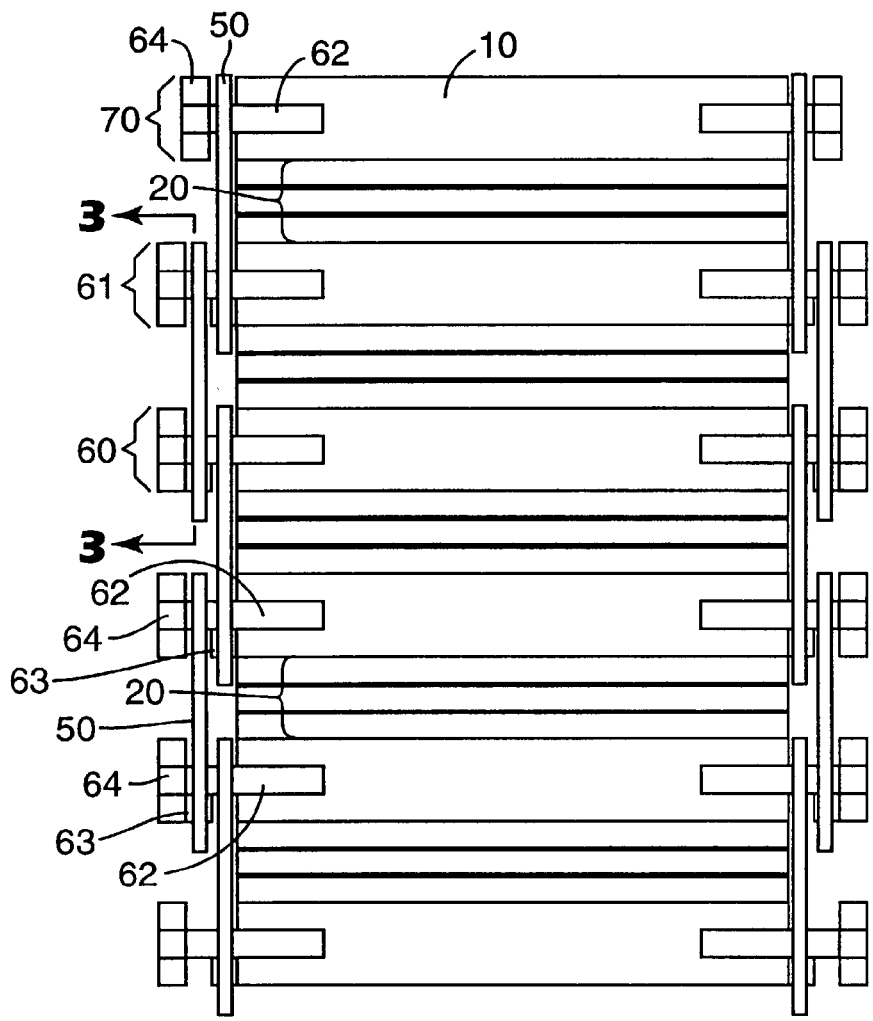
FIG. 2 is a schematic cross section of a fuel cell stack according to the present invention.
Figure 3:
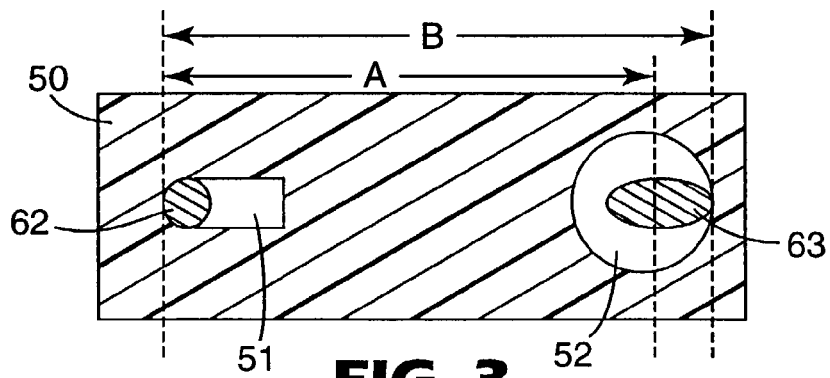
FIG. 3 is a diagram representing a cross section of a latch according to the present invention.

With reference to FIGS. 1–3, a fuel cell stack according to the present invention comprises compression plates (10) stacked alternately with fuel cell modules (20). Fuel cell modules (20) comprise at least one membrane electrode assembly (MEA) (30), and may contain two or more MEA's (30). MEA's (30) are interleaved with distribution plates (40) to form fuel cell modules (20). Compression plates (10) may be made of any suitable material. Compression plates (10) are typically made of an electrically conductive material, such as a metal, or plated metal material.

Figure 7:
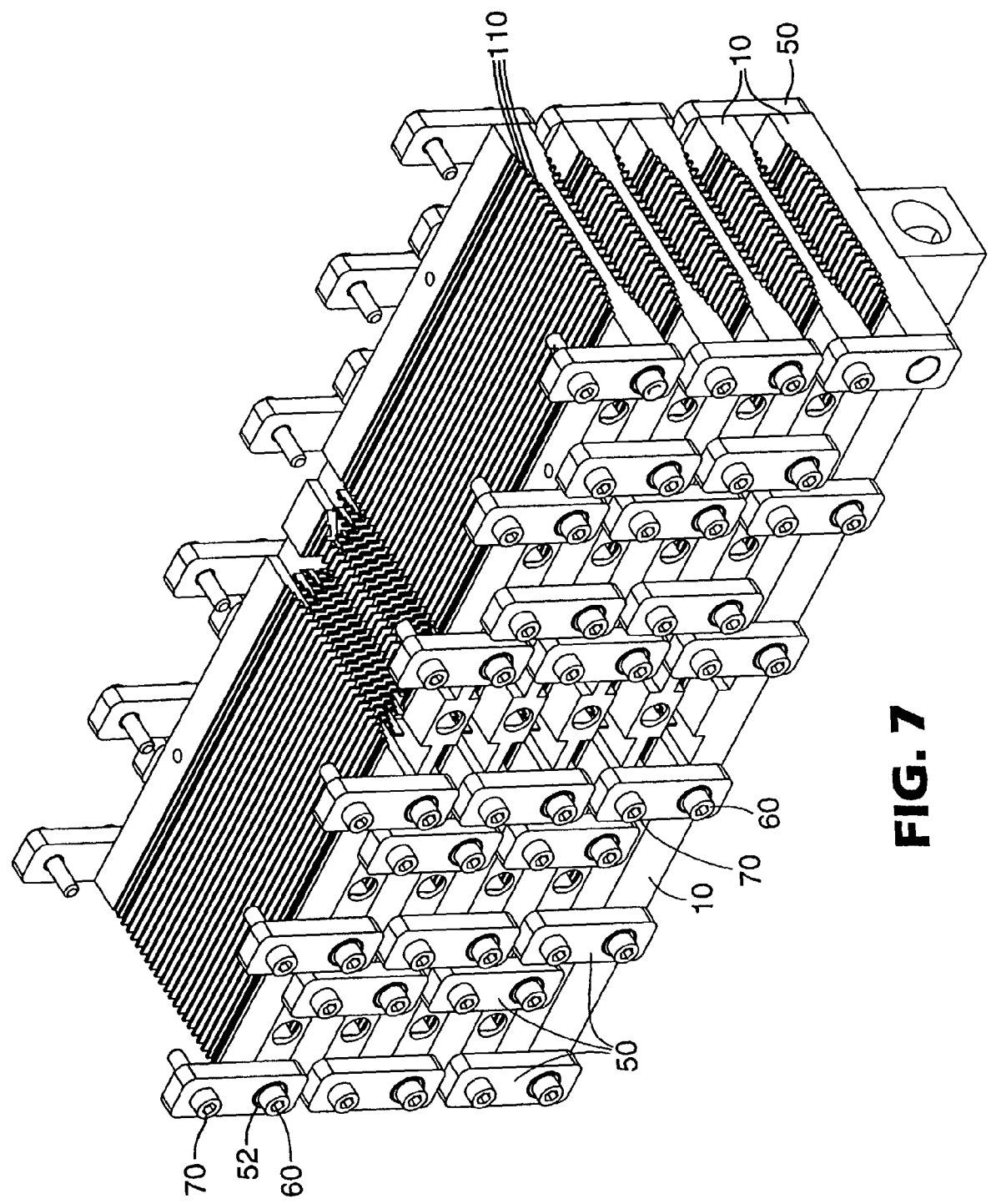
FIG. 7 is an isometric drawing representing an orthogonal projection of a compression plate apparatus according to the present invention.

Compression plates (10) typically comprise cooling channels (110) adapted for air or liquid cooling of the fuel cell modules (20). The secondary use of compression plates (10) for cooling simplifies stack design and manufacture by reducing the number of parts and allows direct contact of cooling plates (compression plates) with fuel cell modules (20). Where the compression plates (10) are used for cooling in this manner, they are typically made of a thermally conductive material such as a metal or plated metal. Additional considerations include weight, cost, and manufacturability. Typically, the compression plates are aluminum. Cooling channels (110) shown in FIGS. 1 and 7 are adapted for air cooling, as they are open to the face of the compression plate (10). In contrast, cooling channels adapted for liquid cooling are more typically internal to the compression plate, opening only at terminal inlet and outlet openings, such as liquid cooling channels (111) in FIG. 8. Air cooling channels (110) may run lengthwise to facilitate their manufacture by low cost aluminum extrusion processes. Typically a fuel cell module (20) will comprise two MEA's (30) so that each MBA (30) is adjacent to a compression plate (10) for purposes of cooling. In the practice of the present invention, any suitable mechanism for delivering cooling fluid to the stack may be used, including fans and pumps, and including a liquid cooling manifold The stack may be wrapped in heat insulating material so that outer and inner portions of the stack are maintained at similar temperatures.

Figure 8:
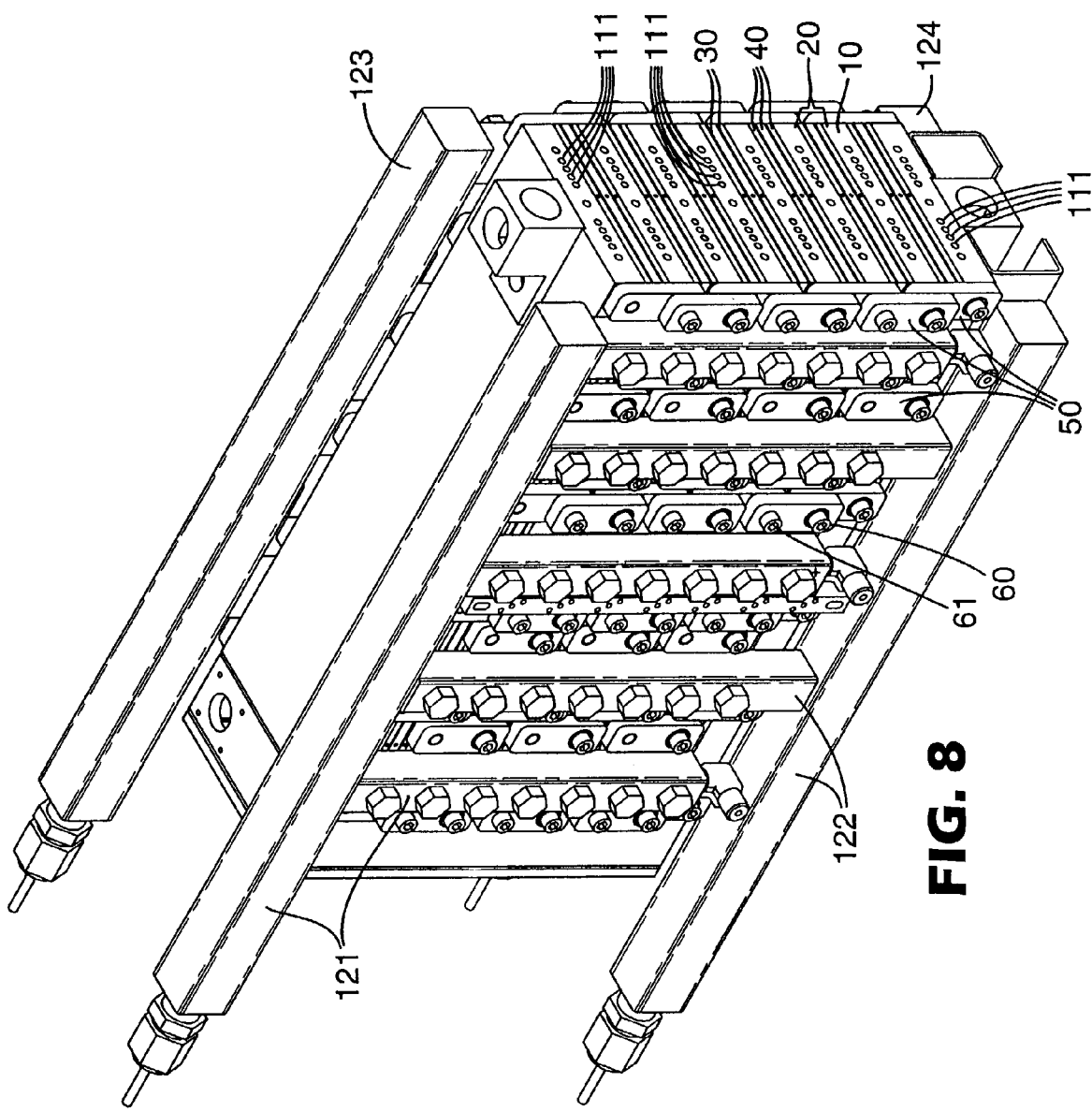
FIG. 8 is an isometric drawing representing an orthogonal projection of a fuel cell stack according to the present invention.

With reference to FIGS. 1 and 8, compression plates (10) may comprise inlet and outlet ports (112, 113), such as shown in FIG. 1, adapted to interact with external manifolds in order to deliver reactant or product fluids to and from distribution plates (40), which in turn deliver reactant or product fluids to and from MEA's (30). FIG. 8 depicts a stack with external manifolds (121, 122, 123, 124) in place. Thus the inlet and outlet ports (112,113) comprise reactant/product pathways for transport of fluids to and/or from said distribution plates. The inlet and outlet ports (112,113) of the compression plates (10) may interact with ports (114) in the distribution plates (40) via O-ring seals that will realign and automatically seal when the fuel cell module (20) is removed and replaced. Since inlet and outlet ports (112,113) carry fluids which may be corrosive to the material of the compression plates (10), inlet and outlet ports (112,113) may have a corrosion resistant coating on their internal surfaces or may be fitted with insert pieces (not shown) comprising a material other than the material of the compression plates, typically a material inert to the reactants or products transported therein, which may include a polyetheretherketone (PEEK) polymer. Optional probe holes (115) are used for voltage or temperature probes.

Alternately, manifolds may be internal to the fuel cell stack. Reactant/product manifolds or coolant manifolds or both may be internal. In the case of internal manifolding, each manifold comprises a series of coinciding openings passing through successive fuel cell modules (20) and compression plates (10), typically in a direction orthogonal to the plane of each plate or module. Typically, o-rings or other seals are located between fuel cell modules (20) and compression plates (10) to form a sealed manifold pathway. The reactant and product manifolds communicate with pathways in each fuel cell module (20) that open into the appropriate channels of the distribution plates (40). The coolant manifolds communicate with pathways in each compression plate (10).

In use, pairs of compression plates (10) are joined by mechanical linkages which may be used to maintain fuel cell modules under compression, yet which enable the compression on one fuel cell module to be adjusted independently of the compression on other fuel cell modules. The mechanical linkage may be made by an adjustable attachment such that the effective length of the linkage, being the distance between first and second attachment points to first and second compression plates, may be varied by adjustment of the adjustable attachment. The adjustable attachment may be an offset cam mechanism, such as the offset cam mechanism depicted in FIGS. 1–3.

With reference to FIGS. 1–3, pairs of compression plates (10) are joined by mechanical linkages comprising latches (50) held in place by cam bolts (60, 61) and bolts (70). Cam bolts (60, 61) comprise a shaft (62), a cam (63) and typically some form of head (64). The cam (63) can be adjacent to the head (64), as in cam bolts (60), or spaced apart from the head (64), as in cam bolts (61). The cam bolts (60, 61) and bolts (70) pass through holes (51, 52) in latches (50) and are fitted in receiving holes in the compression plates (10). Both bolt shaft (62) and receiving holes in compression plates (10) are typically threaded. Cam bolts (60, 61) and bolts (70) are made of any suitable material, such as stainless steel, and in any suitable size so as to provide the requisite mechanical properties.

Latches (50) comprise two holes (51, 52). The shaft hole (51) may be elongated so as to form a slot, to allow lateral motion of the latch. The cam hole (52) is sufficiently large to include the cam (63) and to allow rotation of the cam therein. One or both holes (51, 52) may contain sleeves, shims or hard inserts to form load bearing surfaces, which may be metal or any suitable hard material. Latches (50) must be electrically non-conductive, so as to avoid short circuiting the fuel cell module (20).

With reference to FIG. 3, it can be seen that rotation of cam (63) in hole (52) by application of suitable torque to the cam bolt (60, 61) of which it forms a part will vary the effective length of the linkage formed by the latch (50) and the shaft (62) and cam (63) of two cam bolts (60, 61) between length A and length B.

With reference to FIGS. 1 and 2, it can be seen that latches (50) joining subsequent pairs of compression plates (10) are in a "piggyback" configuration. In this configuration, cam bolts (60, 61) are shared between two latches. A single cam bolt (60, 61) passes through the shaft hole (51) of one latch (50) and the cam hole (52) of another. It will be readily seen that the placement of the cam (63) on the shaft (62), which distinguishes cam bolt 60 from cam bolt 61, is dictated by this configuration. FIG. 7 depicts an alternate configuration, a "side-by-side" configuration, wherein latches (50) joining subsequent pairs of compression plates (10) do not overlap but are instead laid side-by-side. In this configuration, a bolt (70) passes through the shaft hole (51) of each latch (50) and a cam bolt (60) passes through the cam hole (52) of each latch (50), but the bolts and cam bolts are not shared between latches. Mixed configurations are also possible. In one mixed configuration, the two end-most columns of latches on each side of the stack are in "piggyback" configuration and intermediate columns are in "side-by-side" configuration.

In a typical fuel stack according to the present invention, each fuel cell module is placed under compression by bringing together each pair of compression plates to a selected displacement or compressive strain, as opposed to application of a selected pressure. As a result, the MEA (30) selected for use in the stack need not have a "hard stop" feature associated with its gasket for preventing over-compression. The degree of displacement is selected with regard to the design of the fuel cell module (20) and the compressive strain required by the selected MEA (30). For that reason, the latches are typically made of a relatively stiff or non-strainable material, i.e., typically a material with a Young's modulus of elasticity of greater than 1 GPa, more typically a material with a Young's modulus of elasticity of greater than 2 GPa, and more typically a material with a Young's modulus of elasticity of greater than 3 GPa. In order to obtain a controlled degree of strain in the fuel cell module, it is desirable that the strain in the latches be much smaller than that in the MEA's, and more particularly in the DCC. The parameters for selection of an appropriate material by its Young's modulus of elasticity are given in more detail in the following equation:

$$Y_{latch}/Y_{DCC} > (X/N) \times (A_{DCC}/A_{latch}) \qquad (1)$$

where $Y_{latch}$ is Young's modulus of elasticity for the latch material, $A_{latch}$ is the minimal cross-sectional area of the latch at the weakest points (e.g. the sides of holes passing through the latch), N is the number of latches, $Y_{DCC}$ is Young's modulus of elasticity for the DCC material, and $A_{DCC}$ is the planar area of the DCC. This equation provides that the strain of the latches is no more than 1/X that of the DCC's, which are typically the most compressible layer of the fuel cell module. X is typically at least 5 and more typically at least 10 but may be higher. Equation 1 is discussed further in Example 1, below, with reference to a model stack.

In addition, the latch material is typically electrically non-conductive, and therefore a strong polymeric non-conductor such as polyetheretherketone (PEEK) is typically used. Alternately, a composite of a metal and a strong polymeric nonconductor such as polyetheretherketone (PEEK) may be used, such as a metal part covered by the polymer.

In a method according to the present invention, a single fuel cell module is removed from a stack without releasing the compression on any other fuel cell module. The fuel cell module to be removed is selected, the compression on that fuel cell module is released, e.g., by rotating the appropriate cam bolts, and the fuel cell module is removed from the stack (as illustrated by the bottom-most module in FIG. 1) all without altering the compression on any other fuel cell module in the stack.

This invention is useful in the manufacture, operation, maintenance, service and repair of fuel cell stacks and systems.

Objects and advantages of this invention are further illustrated by the following examples, but the particular materials and amounts thereof recited in these examples, as well as other conditions and details, should not be construed to unduly limit this invention.

EXAMPLES

Example 1

This example describes the fabrication and use of cam bolts and latches to apply compressive strain to a pair of simulated MEA's and bi-polar plates between aluminum compression plates, in which the latch design permits 15% strain of the DCC's.

A fuel cell module with two MEA's was simulated using full sized bi-polar plates machined from LEXAN, with identical dimensions and flow fields to working metal bi-polar plates. The plates had outside dimensions of 3.72"× 12.19" (9.45 cm×30.96 cm) and together had a combined thickness of 0.467±0.001" (1.186±0.003 cm). Two MEA's were assembled between the plate-sets, consisting of coated Textron carbon cloth DCC's and 2 mil (51 micrometer) thick PTFE sheets to simulate the catalyst coated ion exchange membrane. The pre-compressed thickness of the two MEA's was measured with a micrometer to be 0.056"±0.002" (0.142±0.005 cm). The area of the DCC's was 31 sq. in. (200 cm$^2$). As illustrated in FIGS. 4a and 4b, two aluminum compression plates (10) were fabricated with the same outside dimensions as the plexiglass bi-polar plates, from 0.5" (1.27 cm) thick Al 6061-T6 stock. The finished thickness of two Al plates together was measured to be 0.996±0.002" (2.530±0.005 cm). As illustrated in FIGS. 4a and 4b, 10-32 tapped holes (80) were equally spaced along the center line of the edges of the 0.5" (1.27 cm) Al plates (10), to allow for six cam-screws on each side of each plate. These cam-screws apply the stress to the latches which compress the module.

Cam-screws were fabricated as follows. Standard hex-head 10-32UNC screws, ⅝" (1.588 cm) long were used. Cam nuts were made by drilling and tapping 10-32 threads 0.0412" (0.1046 cm) off-center in a steel drill rod 0.375" (0.953 cm) in diameter. The nuts were then made by parting off the rod in sections to a thickness of 0.188" (0.478 cm). The cam nuts were then attached to the 10-32 screws to a fully screwed-on position and secured with Lok-Tite.

Figure 5A:
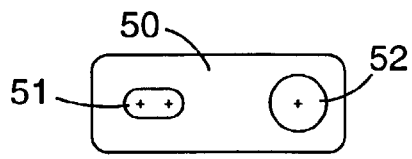
FIGS. 5(*a*) and (*b*) are diagrams representing latches according to the present invention, described in Examples 1 and 2 below.

The latches were fabricated using 0.188" (0.478 cm) thick PEEK, polyetheretherketone, an industrial plastic. The latches were made rectangular in shape with a ⅜" (0.953 cm) hole on one end and smaller clearance slot for the 10-32 screw on the other. FIG. 5(a) shows the latch dimensions used in this example.

The plexiglass plates and MEA's were assembled between two of the Al compression plates shown in FIG. 4. A shim of thickness 0.0085" (0.0216 cm) made of an essentially incompressible material was added to bring the total pre-compressed thickness of the stack to 1.528" (3.881 cm)=0.996" (2.530 cm) (Al plates)+0.467" (1.186 cm) (plexiglass plates)+0.0085" (0.0216 cm) (shim)+0.056" (0.142 cm) (MEA's). Gaskets were used on the perimeters only to act as alignment guides for stacking the DCC's. That is, their thickness was sufficiently less than that of the DCC's so that they could not act as hard-stops to the compression. Twelve PEEK latches and the cam-screws were attached to the Al compression plates with standard 10-32 screws holding the latches in place on one edge of each plate. The cam-screws were rotated to the "open position" to give a gap between the plates, until all the cam-screws and latches were in place. In this "open position" the cam axis is aligned parallel to the plane of the Al compression plates. Then the cam-screws were rotated clockwise ¼ of a turn to position the cam axis perpendicular to the plane of the compression plates, to obtain maximum compression of the MEA's. A vernier caliper was used to record the compressed thickness, L, of the overall assembly at the positions of the twelve latches, six on each side of the assembly. These measured thickness are summarized in FIG. 6(a). The average assembly thickness L at the six top latch positions was 1.520±0.002" (3.861±0.005 cm). The average assembly thickness L at the six bottom latch positions is 1.516±0.002" (3.851±0.005 cm), and there is a 0.004" (0.010 cm) side-to side difference. The overall average compressed thickness is 1.518" (3.856 cm). Since the pre-compressed thickness was 1.528" (3.881 cm), this represents a compressive strain of 0.010" (0.025 cm). Because the DCC's are essentially the only compressible components within the assembly, and they had a pre-compressed thickness of 0.056" (0.142 cm), this represents a % strain compression of the DCC's of 18%.

It is important to note that the PEEK latches are acting as extremely stiff springs. As such they also undergo some tensile strain during the compression of the DCC's. If F is the force applied to a latch and $A_{latch}$ the minimal cross-sectional area of the latch at the weakest points (e.g. the sides of the ⅜" (0.953 cm) holes in FIG. 5), then the strain, $S_{latch}$, is related to F by the modulus, $Y_{latch}$ of the material simply as $F/A_{latch}=Y_{latch}S_{latch}$. In effect, the tensile strain of the latches is being used to produce the compressive strain of the DCC's. A similar relation applies to the DCC's, $F/A_{DCC}=Y_{DCC}S_{DCC}$. In order to be able to effect a controlled compressive strain of the DCC's, it is desirable to design the latches so that for a given modulus or stress-strain curve of the DCC's, the strain of the latches is no more than say 10% of that of the DCC's. Since the compressive force experienced by both is the same, the requirement that the DCC strain be 10× as much as the latch strain implies that, for a number N latches, $$Y_{latch}/Y_{DCC} > (10/N) \times (A_{DCC}/A_{latch}). \quad (1)$$

For this Example 1, where N=12, $A_{DCC}$=200 cm²=31.0 sq in., and $A_{latch}$=2(0.187×0.125)=0.0468 sq. in. (2(0.475× 0.317)=0.302 cm²), this condition requires that $Y_{latch}$>552× $Y_{DCC}$. The stress strain curves of the Textron carbon cloth DCC's was measured with an Instron and found to be fairly linear over the 0–25% strain range with a modulus of 400 psi (2.76 MPa). From a handbook of mechanical and thermal properties of industrial plastics, the tensile modulus of PEEK is 4.9×10⁵ psi (3.38 GPa), and the latch design in FIG. 5(a) is thus seen to easily provide the required modulus to achieve only 1/10 of the strain experienced by the DCC's. In practice, however, the latch design in FIG. 5(a) suffered a deflection of its end because the material thickness between the ⅜" (0.953 cm) hole and the end of the latch was too small, causing the ⅜" (0.953 cm) hole to become slightly oblong under stress. This was corrected in Example 2.

Example 2

In this example the PEEK latch design was changed slightly to make it stronger.

Figure 5B:
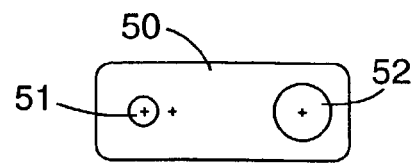

The latch design shown in FIG. 5(b) was made and tested. It is made from 0.25" (0.635 cm) thick PEEK and the end thickness outside the ⅜" (0.953 cm) diameter hole was increased to reduce the bending deflection of the latch in Ex. 1. Also, steel rings, of ~1/32" (~0.08 cm) wall thickness and ⅜" (0.953 cm) inner diameter, were press fitted into the large holes of the latches to more uniformly distribute the stress over the entire end of the latch. A smaller steel ring was also inserted into the smaller hole on the other end, for the 10-32 screw, to prevent the screw threads from indenting into the PEEK within the clearance hole. The new latches and same cam screws were then assembled with the same module and Al plates as in Ex. 1. The measured compressed thicknesses after rotating the cams to the compressed positions are summarized in FIG. 6(b). For this reinforced latch, the average thickness at the top and bottom latch positions are 1.508±0.002" (3.830±0.005 cm) and 1.507±0.002" (3.828±0.005 cm), respectively. The overall compressed thickness is 1.507" (3.828 cm). Since the pre-compressed thickness was 1.528" (3.881 cm), this represents a compressive strain of 0.021" (0.053 cm). Because the DCC's are essentially the only compressible components within the assembly, and they had a pre-compressed thickness of 0.056" (0.142 cm), this represents a % strain compression of the DCC's of 37%. This is twice the strain achieved with the first latch in Ex. 1, and exceeds the target strain of 25–30% for this type of carbon cloth DCC. Also, the side to side difference has been reduced from 0.004" (0.010 cm) to less than 0.001" (0.0025 cm). So this latch and cam-screw design is capable of providing the desired compressive strain to a module containing two MEA's. Two achieve the desired 25–30% strain, the separation between the latch holes could be reduced, or the cam-nut offset could be increased slightly, or the incompressible shim thickness could be reduced.

The latch material, latch design and number of latches must be selected so as to provide the required overall force without breakage. In the current example, the 31 sq inch area (200 cm²) of the DCC's and 400 psi (2.76 MPa) compressive modulus imply that for a 30% strain, a total force of 3720 lbs (16,547 N) must be applied to the DCC's. If, in addition, the MEA's are operating at 30 psig (0.21 MPa gauge) internal pressure, an additional force of 930 lbs (4137 N) will be trying to force the aluminum compression plates apart. Thus the latches must be capable of applying a force of 4,650 lbs (20,684 N) without breaking. The tensile strength at the break point for PEEK is 14,500 psi (100 MPa). So for the latch designs used in this Ex.2, the 12 latches can support a total force at the breakpoint of 12×2× 0.25" (0.635 cm)×0.125" (0.318 cm)×14,500 psi (100 MPa) =10,875 lbs (48,400 N), which is 2.3 times the maximum required. This margin could be easily increased by making the latches slightly wider at their thinnest points.

The coefficient of linear thermal expansion of PEEK over the temperature range of 0 to 290° F. (−18 to 143° C.) is 2.6×10⁻⁵. For an operating fuel cell heating from ambient to 176° F. (80° C.), this 103° F. (57° C.) temperature increase would cause the length to increase by 0.267%. For the latch hole spacing in FIG. 5 of 1.059" (2.690 cm), this thermal expansion would in theory produce a length change of 0.0028" (0.0071 cm) and would result in only a reduction of the compressive strain from 0.021" (0.053 cm) to 0.018" (0.046 cm), or, in percentage terms, from 37% to 32% strain of the DCC's. However, the internal MEA and other components will also expand with temperature so thermal expansion of the PEEK is desirable to prevent over compression of the internal components.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A fuel cell stack comprising:
one or more fuel cell modules, each fuel cell module comprising at least one membrane electrode assembly, said membrane electrode assembly comprising no hard stop layer;
two or more compression plates; and
at least one plurality of mechanical linkages connecting at least one pair of compression plates located on either side of at least one fuel cell module, which may be engaged to maintain a predetermined gap distance between said pair of compression plates;
wherein said plurality of mechanical linkages comprises a mechanical linkage which comprises a latch attached to a first compression plate at a first attachment point on said first compression plate and attached to a second compression plate at a second attachment point on said second compression plate, said mechanical linkage having an effective length being the distance between said first and second attachment points, said latch being attached by an adjustable attachment to at least one of said first and second compression plates such that the effective length of said mechanical linkage may be varied by adjustment of said adjustable attachment;
wherein said adjustable attachment comprises an offset cam mechanism.

2. The fuel cell stack according to claim 1 wherein said offset cam mechanism comprises a cam bolt passing through a first hole in said latch and into a first hole in a compression plate, wherein said cain bolt comprises an offset cam adapted to contact an inner surface of said first hole in said latch, and wherein said cam bolt may be rotated by application of suitable torque.

3. A fuel cell stack comprising:
one or more fuel cell modules, each fuel cell module comprising at least one membrane electrode assembly, said membrane electrode assembly comprising no hard stop layer;
two or more compression plates; and
at least one plurality of mechanical linkages connecting at least one pair of compression plates located on either side of at least one fuel cell module, which may be engaged to maintain a predetermined gap distance between said pair of compression plates;
wherein said plurality of mechanical linkages comprises a mechanical linkage which comprises a latch attached to a first compression plate at a first attachment point on said first compression plate and attached to a second compression plate at a second attachment point on said second compression plate, said mechanical linkage having an effective length being the distance between said first and second attachment points, said latch being attached by an adjustable attachment to at least one of said first and second compression plates such that the effective length of said mechanical linkage may be varied by adjustment of said adjustable attachment;
wherein said latch is attached to one of said first and second compression plates by a non-adjustable attachment;
wherein said non-adjustable attachment comprises a bolt passing through a second hole in said latch and into a first hole in one of said first and second compression plates.

4. A fuel cell stack comprising:
two or more fuel cell modules, each fuel cell module comprising at least one membrane electrode assembly;
three or more compression plates stacked alternately with said fuel cell modules;
a first plurality of mechanical linkages connecting a first pair of compression plates which are directly adjacent to, and on either side of, a first fuel cell module; and
a second plurality of mechanical linkages connecting a second pair of compression plates which are directly adjacent to, and on either side of a second fuel cell module;
wherein one compression plate is common to said first and second pairs of compression plates;
wherein said first and second fuel cell modules may be maintained under compression and wherein the compression on each of said first and second fuel cell modules may be adjusted essentially independently of the compression on the other of said first and second fuel cell modules;
wherein said plurality of mechanical linkages comprises a mechanical linkage which comprises a latch attached to a first compression date at a first attachment point on said first compression plate and attached to a second compression plate at a second attachment point on said second compression plate, said mechanical linkage having an effective length being the distance between said first and second attachment points, said latch being attached by an adjustable attachment to at least one of said first and second compression plates such that the effective length of said mechanical linkage may be varied by adjustment of said adjustable attachment;
wherein said adjustable attachment comprises an offset cam mechanism.

5. The fuel cell stack according to claim 4 wherein said offset cam mechanism comprises a cam bolt passing through a first hole in said latch and into a first hole in a compression plate, wherein said cam bolt comprises an offset cam adapted to contact an inner surface of said first hole in said latch, and wherein said cain bolt may be rotated by application of suitable torque.

6. A fuel cell stack comprising:
two or more fuel cell modules, each fuel cell module comprising at least one membrane electrode assembly;
three or more compression plates stacked alternately with said fuel cell modules;
a first plurality of mechanical linkages connecting a first pair of compression plates which are directly adjacent to, and on either side of, a first fuel cell module; and
a second plurality of mechanical linkages connecting a second pair of compression plates which are directly adjacent to, and on either side of a second fuel cell module;
wherein one compression plate is common to said first and second pairs of compression plates;
wherein said first and second fuel cell modules may be maintained under compression and wherein the compression on each of said first and second fuel cell modules may be adjusted essentially independently of the compression on the other of said first and second fuel cell modules;
wherein said plurality of mechanical linkages comprises a mechanical linkage which comprises a latch attached to a first compression plate at a first attachment point on said first compression plate and attached to a second compression plate at a second attachment point on said second compression plate, said mechanical linkage having an effective length being the distance between said first and second attachment points, said latch being attached by an adjustable attachment to at least one of said first and second compression plates such that the effective length of said mechanical linkage may be varied by adjustment of said adjustable attachment;

wherein said latch is attached to one of said first and second compression plates by a non-adjustable attachment;

wherein said non-adjustable attachment comprises a bolt passing through a second hole in said latch and into a first hole in one of said first and second compression plates.

* * * * *

UNITED STATES PATENT AND TRADEMARK OFFICE
CERTIFICATE OF CORRECTION

PATENT NO. : 7,163,761 B2  
APPLICATION NO. : 10/294224  
DATED : January 16, 2007  
INVENTOR(S) : Mark K. Debe Page 1 of 1

It is certified that error appears in the above-identified patent and that said Letters Patent is hereby corrected as shown below:

Col. 4  
Line 20, delete "Theological" and insert -- rheological --, therefor.  
Line 59, delete "MBA" and insert -- MEA --, therefor.  
Line 67, delete "MBA" and insert -- MEA --, therefor.

Col. 5  
Line 2, delete "1CM" and insert -- ICM --, therefor.  
Line 3, delete "MBA" and insert -- MEA --, therefor.  
Line 44, delete "MBA" and insert -- MEA --, therefor.

Col. 7  
Line 56, delete "nonconductor" and insert -- non-conductor --, therefor.

Col. 11  
Line 37, in Claim 2, delete "cain" and insert -- cam --, therefor.

Col. 12  
Line 15, in Claim 4, after "side of" insert -- , --.  
Line 27, in Claim 4, delete "date" and insert -- plate --, therefor.  
Line 44, in Claim 5, delete "cain" and insert -- cam --, therefor.  
Line 56, in Claim 6, after "side of" insert -- , --.

Signed and Sealed this

Fourteenth Day of August, 2007

JON W. DUDAS  
*Director of the United States Patent and Trademark Office*